Dec. 8, 1964   F. L. OHLSEN ETAL   3,160,196
TIRE BEAD BREAKER
Filed Aug. 7, 1963   2 Sheets-Sheet 1
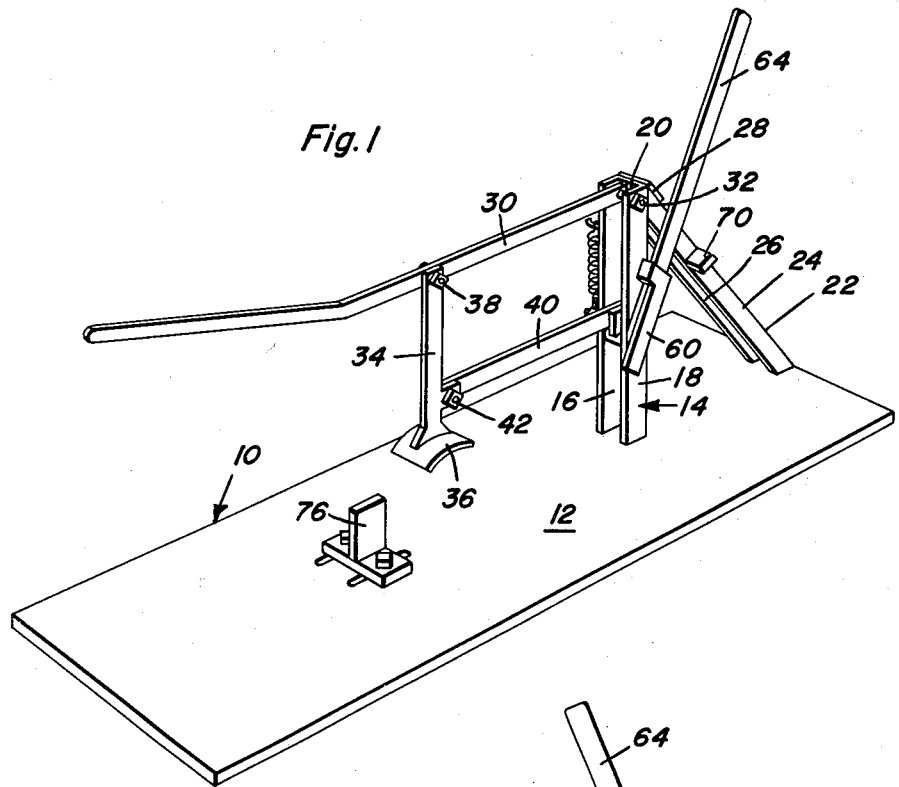
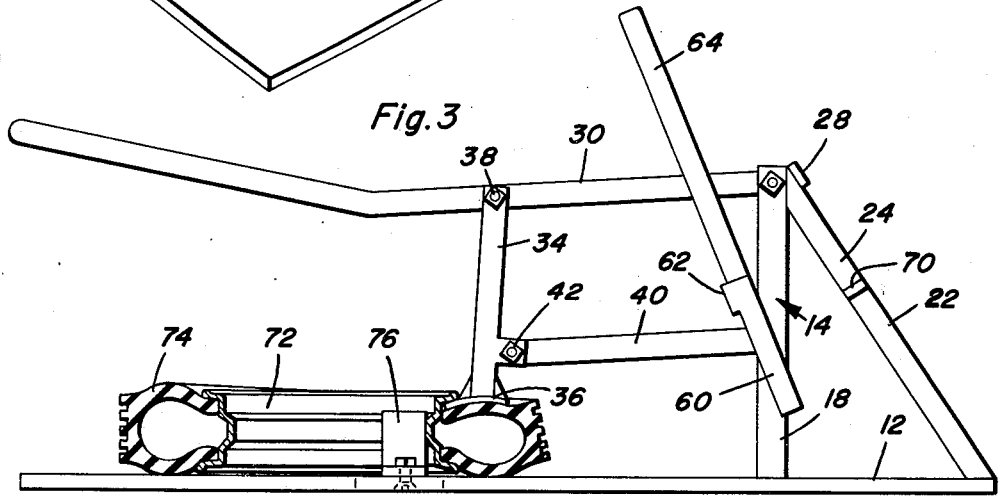
Frederick L. Ohlsen
Verna J. Ohlsen
INVENTORS Dec. 8, 1964 F. L. OHLSEN ETAL 3,160,196
TIRE BEAD BREAKER
Filed Aug. 7, 1963 2 Sheets-Sheet 2
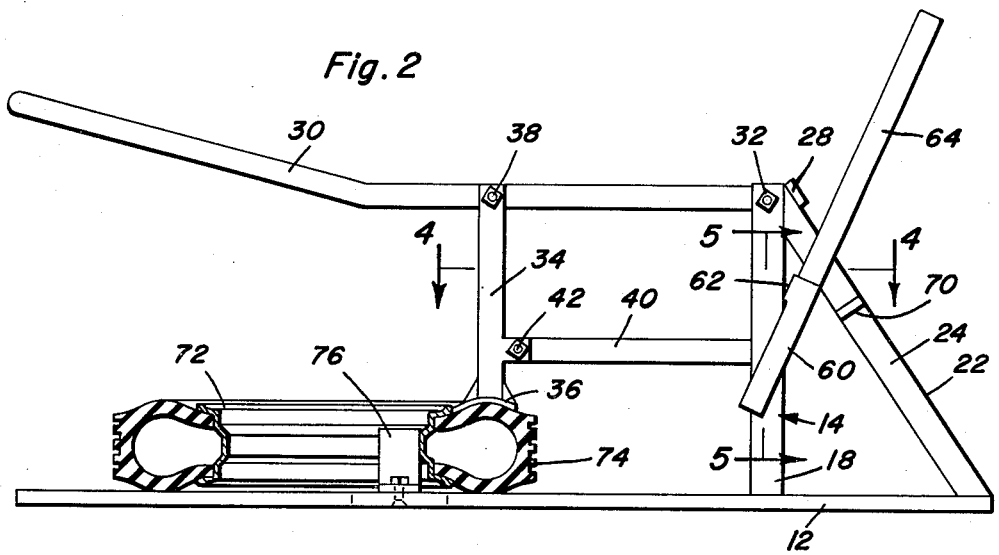
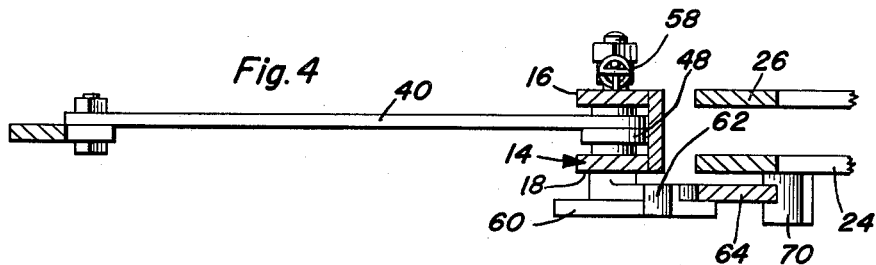
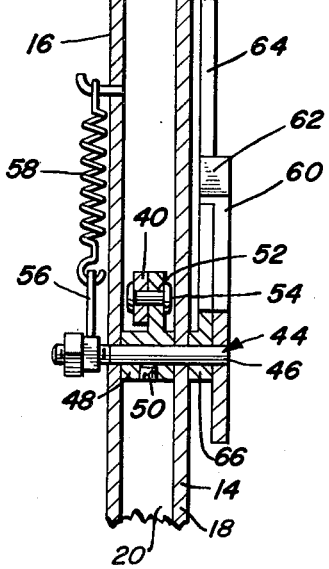
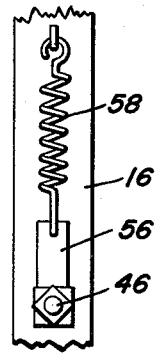
Frederick L. Ohlsen
Verna J. Ohlsen
INVENTORS

United States Patent Office 3,160,196
Patented Dec. 8, 1964

3,160,196
TIRE BEAD BREAKER
Frederick L. Ohlsen and Verna J. Ohlsen, both of
Rte. 1, Box 4A, Ruthven, Iowa
Filed Aug. 7, 1963, Ser. No. 300,424
8 Claims. (Cl. 157—1.17)

This invention relates to a novel and useful tire bead breaker and more specifically to a tire bead breaker adapted to break a tire casing bead from the wheel rim retaining flange against which it is seated by wedgingly urging a pressure foot member between the tire bead and the wheel rim retaining flange.

Many different types of tire bead breaker machines have been heretofore designed but most have included means by which one side wall of a tire casing is urged axially of the casing toward the corresponding portion of the other side wall of the casing. While this type of action is sufficient in some cases to unseat a tire casing bead from its engagement with the retaining flange of a vehicle wheel, a tire bead sometimes is so securely seated that the conventional type of tire bead breaker will function only to acutely flex the side wall of the tire casing which is to be removed immediately adjacent the bead area. This acute flexing of the side wall of the tire casing has a tendency to inflict damage upon the cords of the casing and in some instances causes the tire bead to even more tightly seat against the corresponding flanges of the vehicle wheel.

It is accordingly the main object of this invention to provide a tire bead breaker of the type provided with the conventional pendulum-type pressure leg provided with a pressure foot on its lower end but constructed in a manner whereby the machine may be utilized to wedgingly force the pressure foot between the tire casing bead and the retaining flange of the wheel rim as well as to apply a force upon the tire bead to urge it laterally toward the other tire bead of the casing.

Another object of this invention is to provide a tire bead breaker including means by which the force applied to the pressure foot to wedgingly thrust the latter between a casing bead and the wheel rim may be effective independently of the force applied to effect a downward thrust on the pressure foot.

Still another object of this invention is to provide a tire bead breaker machine including means for supporting and properly positioning a vehicle wheel having a tire casing mounted thereon relative to the pressure leg and foot of the bead breaker machine.

A final object of this invention to be specifically enumerated herein is to provide a tire bead breaker machine in accordance with the preceding objects which will conform to conventional forms of manufacture, be of simple construction and easy to use so as to provide a device which will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the tire breaker machine of the instant invention;

FIGURE 2 is a side elevational view of the tire breaker machine with the pressure leg and foot shown in position to be utilized to disengage one bead portion of a vehicle tire from the wheel rim against which it is seated, the vehicle wheel and tire casing being shown in vertical section;

FIGURE 3 is a side elevational view of the tire bead breaker similar to that of FIG. 2 but showing the movable parts of the tire bead breaker machine in different positions and in operation;

FIGURE 4 is an enlarged fragmentary horizontal sectional view taken substantially upon the plane indicated by the section line 4—4 of FIG. 2;

FIGURE 5 is a fragmentary enlarged vertical sectional view taken substantially upon the plane indicated by the section line 5—5 of FIG. 2; and FIGURE 6 is a fragmentary side elevational view of the assembly illustrated in FIG. 5 and as seen from the left side thereof.

Referring now more specifically to the drawings, the numeral 10 generally designates the tire breaker machine of the instant invention. The machine 10 includes a base 12 and the lower end of a standard generally referred to by the reference numeral 14 is fixedly secured to the base 12 in any convenient manner.

The standard 14 comprises a channel member including a pair of leg flanges 16 and 18 interconnected by means of a bight portion 20. An inclined brace 22 is also provided and includes a pair of sides 24 and 26 which are secured at their lower ends to the base 12 a spaced distance from the standard 14 and at their upper ends to the upper end of the standard 14 in a convenient manner. In addition, the upper ends of the sides 24 and 26 are interconnected by means of a brace plate 28.

A generally horizontally disposed lever handle 30 is pivotally secured at one end to the upper end of the standard 14 by means of a suitable fastener 32. The fastener 32 is secured through the legs 16 and 18 and rotatably received through the lever handle 30.

A depending pressure leg 34 including an arcuate pressure foot 36 on its lower end has its upper end pivotally secured to the lever handle 30 intermediate its opposite ends by means of a pivot fastener 38. A connecting link 40 is provided and has one end pivotally secured to the lower end of the pressure leg 34 by means of a pivot fastener 42 and the other end pivotally secured to the standard 14 below the fastener 32 by means of a crank generally referred to by the reference numeral 44, see FIGS. 4 and 5.

The crank 44 comprises a pivot shaft 46 which is passed through the legs 16 and 18 and has a crank arm 48 secured thereto for rotation therewith by means of a setscrew 50. The crank arm 48 is disposed between the legs 16 and 18 and is provided a transverse bore 52 at its outer end through which a pivot fastener 54 defining a crank pin is rotatably received. The adjacent end of the connecting link 40 is pivotally secured to the outer end of the crank arm 48 by means of a pivot fastener 54.

One end of the pivot shaft 46 has a second crank arm 56 secured thereto for rotation therewith and an expansion spring 58 is secured between the outer end of the crank arm 56 and the leg 16 and is utilized to yieldingly urge the crank arm 56 to a vertical position and therefore the pivot shaft 46 to a predetermined position of rotation, in which position of rotation the crank arm 48 is substantially vertically disposed.

With attention now invited more specifically to FIGS. 1 and 5 of the drawings it may be seen that a third crank arm 60 is secured to the end of the pivot shaft 46 remote from the crank arm 56. The crank arm 60 is pivoted to the pivot shaft 46 for rotation therewith and includes a laterally directed abutment portion 62 at its free end. An actuating lever 64 has one end rotatably journaled on the pivot shaft 46 as at 66 and includes a portion intermediate its opposite end which is engageable with the abutment portion 62 of the crank arm 60. In addition, the side 24 includes an abutment 70 against which the same portion of the lever arm 54 may abut.

In operation, the vehicle wheel rim 72 having a tire casing 74 mounted thereon may be properly positioned on the base 12 by means of the adjustable upstanding abutment 76 carried by the base 12 so as to properly position the casing 74 in vertical alignment with the lower end of the pressure leg 34. Inasmuch as the pressure leg 34, the standard 14, the lever handle 30, and the connecting link 40 define a parallelogram linkage it may be seen that the lever handle 30 may be swung about its axis of rotation relative to the standard 14 while maintaining the pressure leg 34 substantially vertically disposed. However, upon rotation of the crank arm 60 about the axis of rotation of the pivot shaft 46 the axis of rotation of the connecting link 40 relative to the standard 14 will be swung about an arc having the pivot shaft 46 as its center whereby the pressure foot 36 may be shafted toward and away from the lower end of the standard 14.

The lever arm 64 includes a lost motion connection with the crank arm 60 and it may be seen that the lever arm 64 may be initially disposed in a rest position disposed against the abutment 70. However, when it is desired to break the casing 74 from the rim 72, the pressure foot 36 may first be positioned as shown in FIG. 2 of the drawings. Then, as a downward force is applied to the free end of the lever handle 30 to effect a downward force against the upper side wall of the casing 74, the lever arm 64 may be swung in a counter-clockwise direction toward the position illustrated in FIG. 3 of the drawings whereupon the lever arm 64 will engage the abutment portion 62 and cause like swinging movement of the crank arm 60. The swinging of the crank arm 60 in a counter-clockwise direction will of course laterally outwardly displace the axis of rotation of the connecting link 40 relative to the standard 14 thereby resulting in the pressure foot 36 being displaced away from the standard 14 and wedgingly forced between the upper side wall of the casing 74 and the retaining flange of the rim 72 against which the upper side wall is seated. In this manner, the bead portion of the upper side wall of the tire casing 74 may be readily disengaged or unseated from engagement with the corresponding retaining flange of the wheel rim 72.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tire bead breaker including a standard adapted at its lower end to be supported from a suitable supporting surface, a generally horizontal lever handle pivotally secured at one end to the upper end of said standard for rotation about a first generally horizontal axis extending transversely of said lever handle and having the upper end of a depending pressure leg pivotally secured thereto intermediate said first axis and the other end thereof for rotation about a second axis generally paralleling said first axis, a connecting link extending between said standard and leg below and generally paralleling said lever handle, means pivotally connecting the opposite ends of said link to said standard and said leg about third and fourth axes, respectively, generally paralleling said first axis, the means pivotally connecting said link to said standard including means for laterally shifting the third axis in a direction toward said leg.

2. The combination of claim 1 wherein the last mentioned means includes means for laterally shifting said third axis independently of swinging movement of said lever handle relative to said standard.

3. The combination of claim 1 wherein the means defining said third axis is eccentrically mounted for swinging movement about a fifth axis generally paralleling said first axis.

4. The combination of claim 3 wherein the last mentioned means comprises crank means journaled from said standard for rotation about said fifth axis and defining an eccentrically disposed crank pin to which the corresponding end of said link is pivotally secured and which thereby defines said fourth axis.

5. The combination of claim 4 wherein said crank means also defines a crank arm which extends generally radially of said fifth axis.

6. The combination of claim 5 including a lever arm pivotally supported at one end from said standard for rotation about an axis extending transversely of said lever arm, generally paralleling a line which parallels said fifth axis, and spaced closely adjacent said fourth axis, said arms being swingable in closely adjacent planes and one of said arms including laterally projecting abutment means engageable by the other of said arms whereby swinging movement of said one arm may be effected by swinging said other arm to a position with said other arm engaging said abutment.

7. The combination of claim 1 wherein the means defining said third axis is eccentrically mounted for swinging movement about a fifth axis generally paralleling said first axis, the last mentioned means comprising crank means journaled from said standard for rotation about said fifth axis and defining an eccentrically disposed crank pin to which the corresponding end of said link is pivotally secured and which thereby defines said fourth axis, and means connected between said standard and said crank means yieldingly urging said crank means to a predetermined position of rotation.

8. The combination of claim 1 including a base to which the lower end of said standard is secured and which includes upwardly projecting indexing means adapted to engage and properly position a wheel rim on said platform relative to said pressure leg whereby a tire on said rim will be properly aligned with the downward path of movement of the lower end of said pressure leg when the free end of said lever handle is swung downwardly.

No references cited.